US012604908B2

(12) United States Patent
Standridge et al.

(10) Patent No.: US 12,604,908 B2
(45) Date of Patent: Apr. 21, 2026

(54) ANIMAL HANGING DEVICE WITH INTEGRATED CLOSED-LOOP FRAME

(71) Applicants: Jeff Standridge, Centerville, TN (US); James Benny Bass, McEwen, TN (US)

(72) Inventors: Jeff Standridge, Centerville, TN (US); James Benny Bass, McEwen, TN (US)

( * ) Notice: Subject to any disclaimer, the term of this patent is extended or adjusted under 35 U.S.C. 154(b) by 0 days.

(21) Appl. No.: 18/911,205

(22) Filed: Oct. 9, 2024

(65) Prior Publication Data

US 2026/0096565 A1     Apr. 9, 2026

(51) Int. Cl.
A22C 15/00          (2006.01)
(52) U.S. Cl.
CPC .................................. A22C 15/003 (2013.01)
(58) Field of Classification Search
CPC ........ A22C 15/00; A22C 15/003; A22B 7/002
USPC ................................ 452/187–189, 191, 192
See application file for complete search history.

(56) References Cited

U.S. PATENT DOCUMENTS 3,162,892 A * 12/1964 Gaston ............... A22C 21/0007
                                                                452/106
3,656,206 A * 4/1972 Klevgard ........... A22C 21/0007
                                                                452/183
4,094,041 A * 6/1978 Steed ........................ A22B 5/06
                                                                452/187
5,875,738 A * 3/1999 Hazenbroek ....... A22C 21/0007
                                                                119/716
8,678,176 B2 * 3/2014 Hazenbroek ....... A22C 21/0053
                                                                198/375
11,690,382 B2 * 7/2023 Teurlinx ............. A22C 21/0053
                                                                452/188
2007/0184768 A1 * 8/2007 Sorensen ........... A22C 21/0007
                                                                452/189
2014/0357175 A1 * 12/2014 Woller, Jr. ............... A22B 5/06
                                                                452/187

* cited by examiner

*Primary Examiner* — Richard T Price, Jr.
(74) *Attorney, Agent, or Firm* — Patterson Intellectual Property Law, P.C.; Samuel A. Raque

(57)          ABSTRACT

The present invention discloses an animal hanging device comprising a closed-loop frame body with a hanging vertex, first and second arms extending from the hanging vertex, first and second bends at the ends of the arms, and a crossbar connecting the ends of the bends. The device provides a secure and stable structure for hanging animals, ensuring safety and ease of use. The closed-loop frame design enhances the strength and durability of the device, making it suitable for various animal hanging applications. The unique configuration of the frame body allows for efficient and reliable hanging of animals, offering a practical solution for handling and suspending animals in a controlled manner.

19 Claims, 8 Drawing Sheets

ANIMAL HANGING DEVICE WITH INTEGRATED CLOSED-LOOP FRAME

FIELD OF THE DISCLOSURE

The present disclosure relates generally to animal hanging devices, and more particularly to methods and devices for hanging various animals.

BACKGROUND

Traditional animal hanging devices have typically consisted of simple hooks or loops attached to a structure for suspending animals during processing. These conventional devices lack versatility and may not provide optimal support for various sizes and weights of animals. Additionally, the nature of these devices limits their adaptability to different processing environments and may result in inefficient handling procedures.

In some instances, more complex animal hanging systems have been developed, incorporating multiple components such as pulleys, chains, and hooks to facilitate the hanging process. While these systems may offer improved adjustability and support, they often require significant manual intervention and setup time, leading to potential inefficiencies in processing operations.

Furthermore, certain animal hanging solutions have attempted to address the limitations of traditional devices by incorporating adjustable features or mechanisms for accommodating different animal sizes. However, these solutions may still lack the desired stability and ease of use required for efficient animal processing operations. Additionally, the complexity of these adjustable systems can introduce potential points of failure and maintenance challenges.

However, none of these approaches have provided a comprehensive solution that combines the features described in this disclosure.

BRIEF SUMMARY

The current disclosure provides an enhancement to conventional devices, at least in part by introducing a novel apparatus and method for hanging animals.

In some aspects, the techniques described herein relate to an animal hanging device, including: a closed-loop frame body, including: a hanging vertex; a first arm extending from the hanging vertex at a first end of the first arm to a second end of the first arm; a second arm extending from the hanging vertex at a first end of the second arm to a second end of the second arm; a first bend with a first end of the first bend arranged at the second end of the first arm; a second bend with a first end of the second bend arranged at the second end of the second arm; and a crossbar arranged between a second end of the first bend and a second end of the second bend.

In some aspects, the techniques described herein relate to an animal hanging device, further including: a first retaining arm arranged at a second end of the first bend and extending substantially parallel to the first arm and from the second end of the first bend to a second end of the first retaining arm; a second retaining arm arranged at a second end of the second bend and extending substantially parallel to the second arm and from the second end of the second bend to a second end of the second retaining arm; and wherein the second end of the first retaining arm is arranged at a first retaining vertex and the second end of the second retaining arm is arranged at a second retaining vertex; wherein the crossbar is arranged directly between the first retaining vertex and the second retaining vertex.

In some aspects, the techniques described herein relate to an animal hanging device, wherein: the closed-loop frame body is formed of a continuous and homogenous metal material.

In some aspects, the techniques described herein relate to an animal hanging device, wherein: the closed-loop frame body is substantially rigid.

In some aspects, the techniques described herein relate to an animal hanging device, wherein: the closed-loop frame body is not collapsible.

In some aspects, the techniques described herein relate to an animal hanging device, wherein: the first arm, the second arm, the first retaining arm, the second retaining arm, and the crossbar extend substantially straight.

In some aspects, the techniques described herein relate to an animal hanging device, wherein: the hanging vertex forms a hanging angle between the first arm and the second arm; the first retaining vertex forms a first retaining angle between the first retaining arm and the crossbar; the second retaining vertex forms a second retaining angle between the second retaining arm and the crossbar; and the first retaining angle is equal to the second retaining angle.

In some aspects, the techniques described herein relate to an animal hanging device, wherein: the hanging angle is less than the first retaining angle and the second retaining angle.

In some aspects, the techniques described herein relate to an animal hanging device, wherein: the closed-loop frame body consists of bent rod with a substantially circular cross-section.

In some aspects, the techniques described herein relate to an animal hanging device, wherein: the hanging vertex, the first arm, the second arm, a first end of the first bend, and a first end of the second bend are substantially aligned in a rear plane; the crossbar, the first retaining vertex, the second retaining vertex, the first retaining arm, the second retaining arm, the second end of the first bend, and the second end of the second bend are substantially aligned in a front plane; and the rear plane and the front plane are separated by an extension of the first bend and an extension of the second bend.

In some aspects, the techniques described herein relate to an animal hanging device, wherein: the first arm, the second arm, and the crossbar form a triangular shape from a direction orthogonal to the rear plane and the front plane.

In some aspects, the techniques described herein relate to an animal hanging device, wherein: the closed-loop frame body is symmetrical about a vertical axis from a direction orthogonal to the rear plane and the front plane.

In some aspects, the techniques described herein relate to an animal hanging device, wherein: the first bend and the second bend each include one or more protrusions configured to engage one or more portions of the animal.

In some aspects, the techniques described herein relate to an animal hanging device, wherein: the first retaining arm, the second retaining arm, a portion of the first arm extending from the second end of the first arm to a distance equal to the length of the first retaining arm, a portion of the second arm extending from the second end of the second arm to a distance equal to the length of the second retaining arm, or a combination thereof further include a textured surface.

In some aspects, the techniques described herein relate to an animal hanging device, wherein: the textured surface includes one or more protrusions, knurling, or grooves.

In some aspects, the techniques described herein relate to an animal hanging device, including: a closed-loop frame body, including: a hanging vertex; a pair of hanging arms extending from the hanging vertex and defining a hanging angle therebetween; a pair of 180-degree bends, each 180-degree bend disposed at an end of each arm of the pair of arms opposite the hanging vertex; a pair of retaining arms, each retaining arm disposed at an end of the 180-degree bend opposite the corresponding hanging arm; and a cross-bar connecting the pair of retaining arms.

In some aspects, the techniques described herein relate to an animal hanging device, wherein: the pair of 180-degree bends include a pair of U-bends.

In some aspects, the techniques described herein relate to an animal hanging device, wherein: each retaining arm of the pair of retaining arms extends parallel with and a length less than each corresponding hanging arm.

In some aspects, the techniques described herein relate to an animal hanging device, wherein: each hanging arm, 180-degree bend, and retaining arm together forms an opening configured to receive a portion of the animal.

In some aspects, the techniques described herein relate to an animal hanging device, wherein: the closed-loop frame body includes a rigid and non-collapsible frame formed of a metal material.

Numerous objects, features, and advantages of the embodiments set forth herein will be readily apparent to those skilled in the art upon reading of the following disclosure when taken in conjunction with the accompanying drawings.

DETAILED DESCRIPTION

Referring now to FIGS. 1-10, various embodiments may now be described of an apparatus and method for hanging an animal.

Figures 1, 2:
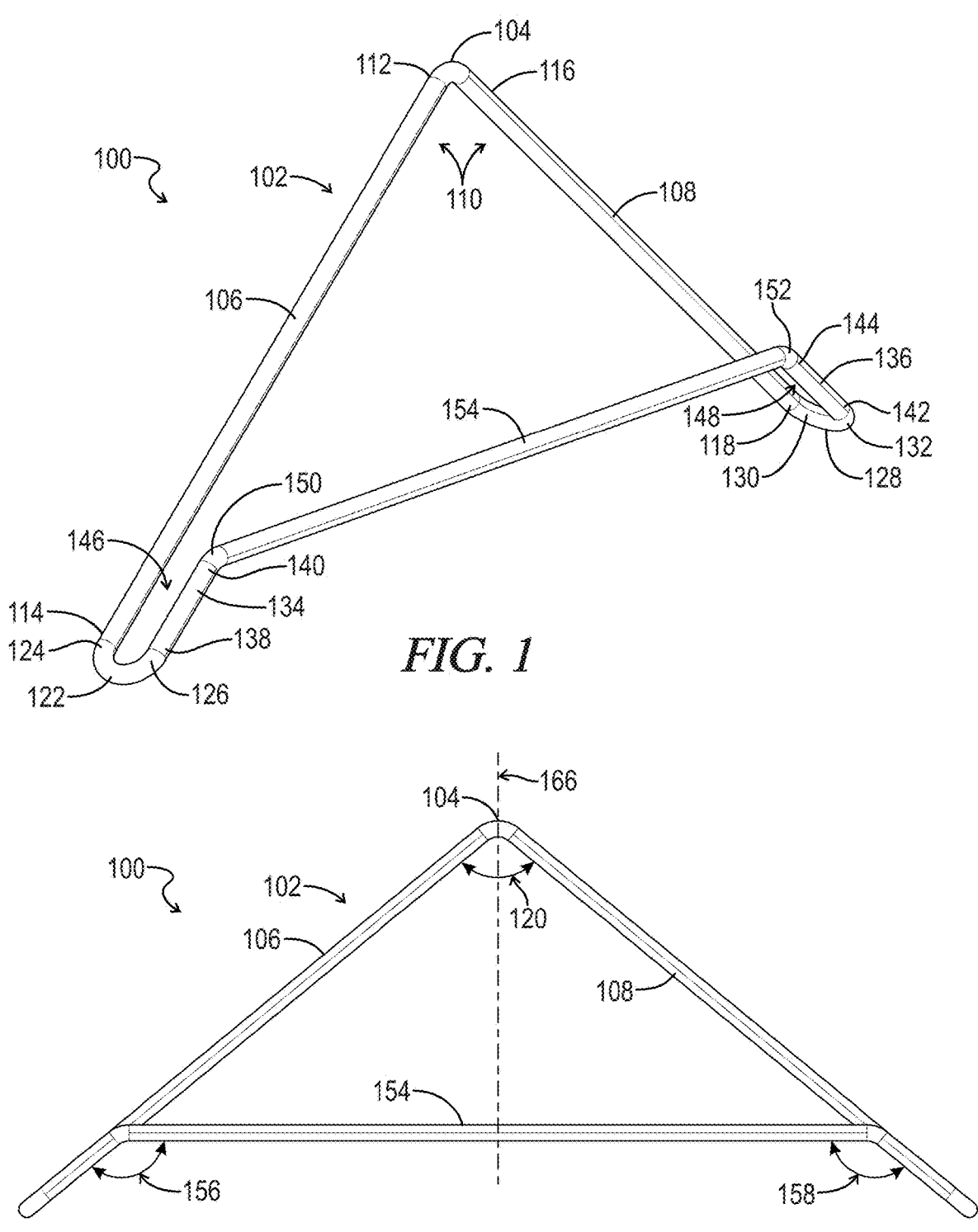
FIG. 1 depicts a perspective view of an animal hanging device 100 according to an aspect of the present disclosure.
FIG. 2 depicts a front plan view of the animal hanging device 100 according to an aspect of the present disclosure.

FIG. 1 depicts a perspective view of an animal hanging device 100 according to an aspect of the present disclosure. The animal hanging device 100 may otherwise herein be referred to as a gambrel. In some aspects, the animal hanging device 100 may include a closed-loop frame body 102. The closed-loop frame body 102 may be formed as a or bar that is bent and curved in locations and ultimately formed back in on itself in order to form a closed-loop structure. The closed-loop frame body 102 may include a continuous loop, forming a closed structure whereby an end of the structure is joined with a beginning of the structure. The closed-loop frame body 102 may include various bends and curves as disclosed further herein which form functional aspects of the animal hanging device 100.

In some aspects, the closed-loop frame body 102 may be formed of a homogeneous material, including metal. In an exemplary aspect, the closed-loop frame body 102 may be formed of stainless steel. In exemplary aspects, the closed-loop frame body 102 may be formed of other suitable metals, including aluminum. In some aspects, the closed-loop frame body 102 may include a coating or protective layer on an exterior of the closed-loop frame body 102.

In some aspects, the closed-loop frame body 102 may be formed as a non-collapsible structure such that none of the straight or curved portions of the closed-loop frame body 102 are configured to bend or change shape to a degree that would alter the overall structure of the animal hanging device 100. It is contemplated within the present disclosure of the animal hanging device 100 that the closed-loop frame body 102 may subject to the weight of an animal hanged thereon and may allow for a degree of flex corresponding to the material forming the closed-loop frame body 102.

In some aspects, the closed-loop frame body 102 includes a bent rod with a substantially circular cross-section throughout the closed-loop frame body 102 such that the diameter of the cross section of the closed-loop frame body 102 is substantially the same throughout the closed-loop frame body 102. In other aspects, cross-section of the closed-loop frame body 102 may include other shapes, including plates, polygonal shapes, surface features, or a combination thereof.

In some aspects, the closed-loop frame body 102 may include a hanging vertex 104 arranged at an apex of the animal hanging device 100 and may provide an area by which the animal hanging device 100 may be supported by an additional structure. In an exemplary aspect, the hanging vertex 104 may be configured to be hung from a support. In some exemplary aspects, the support may be provided as a bracket, a hook, an armature, a cable, a rope, or any suitable suspension system utilized for hanging any size animal.

In some aspects, the closed-loop frame body 102 may further include a first hanging arm 106 and a second hanging arm 108, both extending from the hanging vertex 104. Together, the first hanging arm 106 and the second hanging arm 108 may form a pair 110 of hanging arms extending from the hanging vertex 104. The first hanging arm 106 may extend from the hanging vertex 104 at a first end 112 of the first hanging arm 106 and extend from the first end 112 to a second end 114 of the first hanging arm 106. Thus, the first hanging arm 106 may include a first length of extension from the first end 112 to the second end 114. Similarly, the second hanging arm 108 may extend from the hanging vertex 104 at a first end 116 of the second hanging arm 108 and extend from the first end 116 to a second end second end 118 of the second hanging arm 108 to extend a second length of extension from the first end 116 to the second end 118. In an exemplary aspect, both the first hanging arm 106 and the second hanging arm 108 extend in a substantially straight manner such that the first hanging arm 106 is substantially straight between the first end 112 of the first hanging arm 106 and the second end 114 of the first hanging arm 106, and the second hanging arm 108 is substantially straight between the first end 116 of the second hanging arm 108 and the second end 118 of the second hanging arm 108.

FIG. 2 depicts a front plan view of the animal hanging device 100 according to an aspect of the present disclosure. In some aspects, the hanging vertex 104 may define a hanging angle 120 between the first hanging arm 106 and the second hanging arm 108. In some aspects, the hanging angle 120 may be tailored depending on a specific use application of the animal hanging device 100. Various parameters may be accounted for in determining the hanging angle 120, including a type of animal, an expected or allowable weight of the animal, an expected or allowable size of the animal. In particular, the hanging angle 120 may be based at least on an expected or allowable spread or span of an animal. The spread may also be referred to as the hanging spread or foot spread and may be measured as the distance between two points where the feet or portions of an animal proximate the feet are attached or suspended. The hanging angle 120 may also be based on the length of extension of each of the pair 110 of hanging arms.

Figure 3:
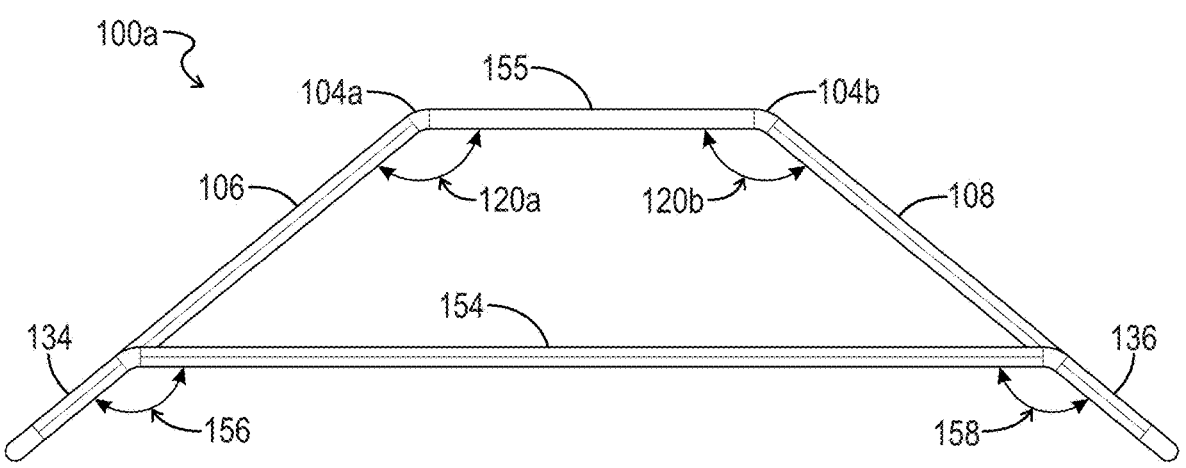
FIG. 3 depicts a front plan view the animal hanging device 100a according to an exemplary aspect of the present disclosure.

FIG. 3 depicts a front plan view the animal hanging device 100a according to an exemplary aspect of the present disclosure. In some aspects, the closed-loop frame body 102 may include more than one of the hanging vertex 104. In an exemplary aspect, the closed-loop frame body 102 may include two of the hanging vertex 104, a first hanging vertex 104a and a second hanging vertex 104b. Each of the first hanging vertex 104a and the second hanging vertex 104b may operate in the same manner as that disclosed for the hanging vertex 104. Each of the first hanging vertex 104a and the second hanging vertex 104b may provide a stable point of hanging where the support on which the animal hanging device 100 is hung include a wider surface area than those typically presented by other smaller supports, such as ropes, hooks, wires, tree branches, and the like. The first hanging vertex 104a and the second hanging vertex 104b may further be jointed by a hanging crossbar 155 extending therebetween. The hanging crossbar 155 may extend as a substantially straight extension between the first hanging vertex 104a and the second hanging vertex 104b. Where the animal hanging device 100a includes more than one of the hanging vertex 104, each of the first hanging vertex 104a and the second hanging vertex 104b may further define a first hanging angle 120a and a second hanging angle 120b, respectively and as disclosed further herein. In an exemplary aspect, the first hanging angle 120a, the second hanging angle 120b, the first retaining angle 156, and the second retaining angle 158 are all substantially coequal.

In some aspects, the closed-loop frame body 102 may further include a first bend 122 generally arranged at the second end 114 of the first hanging arm 106. The first bend 122 may include a first end 124 of the first bend 122 arranged at the second end 114 of the first hanging arm 106. The first bend 122 may further extend from the first end 124 of the first bend 122 to a second end 126 of the first bend 122. Similarly, the closed-loop frame body 102 may include a second bend 128 generally arranged at the second end 118 of the second hanging arm 108. The second bend 128 may include a first end 130 of the second bend 128 arranged at the second end 118 of the second hanging arm 108. The second bend 128 may further extend from the first end 130 of the second bend 128 to a second end 132 of the second bend 128.

In some aspects, the closed-loop frame body 102 may further include a first retaining arm 134 and a second retaining arm 136. The first retaining arm 134 may be arranged to extend from the second end 126 of the first bend 122. The first retaining arm 134 may include a first end 138 at the second end 126 of the first bend 122 and extend to a second end 140 of the first retaining arm 134. Similarly, the second retaining arm 136 may be arranged to extend from the second end 132 of the second bend 128. The second retaining arm 136 may include a first end 142 at the second end 132 of the second bend 128 and extend to a second end 144 of the second retaining arm 136. In an exemplary aspect, each of the first retaining arm 134 and the second retaining arm 136 extend in a substantially straight manner such that the first retaining arm 134 is substantially straight between the first end 138 of the first retaining arm 134 and the second end 140 of the first retaining arm 134, and the second retaining arm 136 is substantially straight between the first end 142 of the second retaining arm 136 and the second end 144 of the second retaining arm 136.

In some aspects, each of the first retaining arm 134 and the second retaining arm 136 extend a length that is only a portion of the length of extension of each of the first hanging arm 106 and the second hanging arm 108. That is, the first retaining arm 134 may extend a length that is less than the length of the first hanging arm 106, and the second retaining arm 136 may extend a length that is less than the length of the second hanging arm 108.

In some aspects, the first retaining arm 134 and the first hanging arm 106 extend from the first bend 122 substantially parallel with each other such that a longitudinal axis of the first hanging arm 106 is substantially parallel with a longitudinal axis of the first retaining arm 134. Similarly, the second retaining arm 136 and the second hanging arm 108 may extend from the second bend 128 substantially parallel with each other such that a longitudinal axis of the second hanging arm 108 is substantially parallel with a longitudinal axis of the second retaining arm 136.

In some aspects, each of the first bend 122 and the second bend 128 include a 180-degree bend. In some further aspects, each of the first bend 122 and the second bend 128 include a U-bend such that legs extending from the ends of each bend are parallel and typically of equal length and the curve of each of the first bend 122 and the second bend 128 has a substantially consistent radius.

In some aspects, the first retaining arm 134, the first bend 122 and a portion of the first hanging arm 106 that extends from the second end 114 of the first hanging arm 106 to a length that is coequal with the length of the first retaining arm 134 all together form a first opening 146 configured to receive a portion of the animal. Similarly, the second retaining arm 136 with the second bend 128 and with a portion of the second hanging arm 108 that extends from the second end 118 of the second hanging arm 108 to a length that is coequal with the length of the second retaining arm 136 together form a second opening 148 configured to receive a second portion of the animal.

In some aspects, the first opening 146 and the second opening 148 define a width of each opening. For example, the width of the first opening 146 may be defined by the distance between the first retaining arm 134 and the first hanging arm 106. In some aspects, the width of each of the first opening 146 and the second opening 148 may range from about 1 inch to about 0.1 inches, from about 0.5 inches to about 0.25 inches, or any distance therebetween. in an exemplary aspect, the width of each of the first opening 146 and the second opening 148 may range from about 0.25 inches to about 3.4 inches.

Figure 5A:
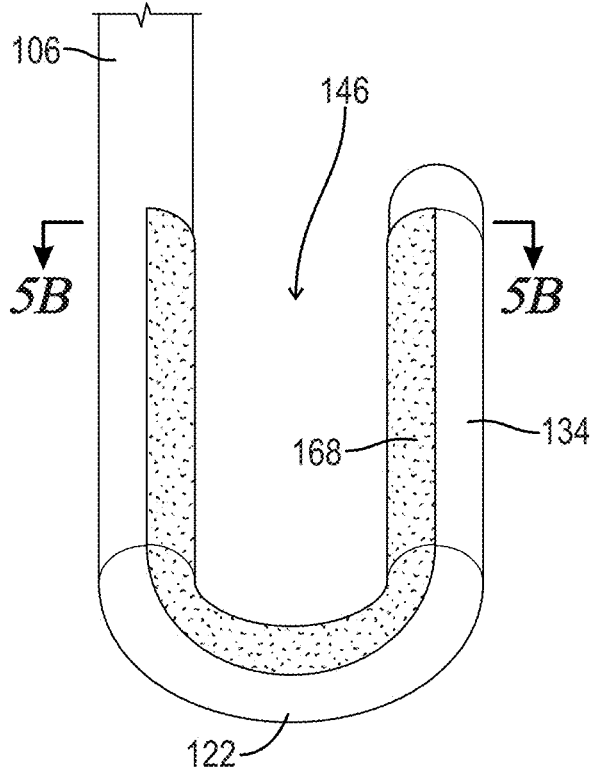
FIGS. 5A-5B depict a side plan view and sectional view of the first opening 146 according to an aspect of the present disclosure.
Figure 5B:
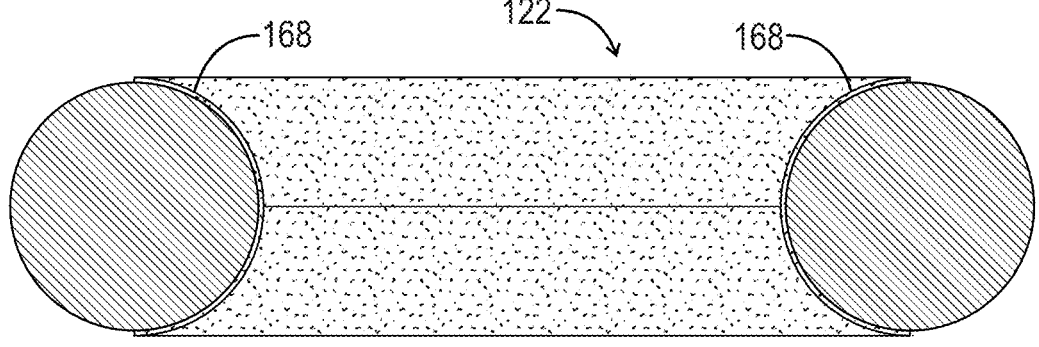

FIGS. 5A-5B depict a side plan view and sectional view of the first opening 146 according to an aspect of the present disclosure. In some aspects, the portions of the animal hanging device 100 configured to engage with a portion of the animal to be hung may include a textured surface 168. In some aspects, the textured surface 168 may be formed directly on the closed-loop frame body 102 or may be further included as an additional structure arranged on the closed-loop frame body 102. Regarding the location the textured surface 168, the textured surface 168 may be provided generally on surfaces of the closed-loop frame body 102 surrounding the first opening 146 and the second opening 148. In some aspects, the textured surface 168 may be provided on a surface of the first retaining arm 134, the second retaining arm 136, a portion of the first hanging arm 106 extending from the second end 114 of the first hanging arm 106 to a distance coequal with the length of the first retaining arm 134, a portion of the second hanging arm 108 extending from the second end 118 of the second hanging arm 108 to a distance coequal with the length of the second retaining arm 136, the first bend 122, the second bend 128, or a combination thereof. In an exemplary aspect, the textured surface 168 may be provided on a surface of either or both the first hanging arm 106 and the first retaining arm 134 that face each other and may also be provided on a surface of either or both the second hanging arm 108 and the second retaining arm 136 that face each other. In a further exemplary aspect, the textured surface 168 may also be provided on a surface of both the first bend 122 and the second bend 128. The textured surface 168 provided on a surface of the first bend 122 and/or the second bend 128 may be provided generally on the concave surface of the corresponding bend. this concave surface of the first bend 122 and/or the second bend 128 may also be referred to as the inner radius or inner surface of each bend. Generally, the textured surface 168 may be provided on any surface of the closed-loop frame body 102 configured to come into contact with and retain a portion of the animal being hung on the animal hanging device 100.

In some aspects, the textured surface 168 may include surface features, including but not limited to, a protrusion, knurling, groove, depression, or a combination thereof. In some aspects, the textured surface 168 may include a plurality of each of the same or varied surface feature to provide a suitable structure to aid in the retaining of a portion of the animal hung from the animal hanging device 100.

In some aspects, the second end 140 of the first retaining arm 134 may be arranged at a first retaining vertex 150 and the second end 144 of the second retaining arm 136 may be arranged at a second retaining vertex 152. The closed-loop frame body 102 may further include a crossbar 154 arranged directly between the first retaining vertex 150 and the second retaining vertex 152. In an exemplary aspect, the crossbar 154 extends in a substantially straight manner between the first retaining vertex 150 and the second retaining vertex 152.

As depicted in FIG. 2, the first retaining vertex 150 may form a first retaining angle 156 between the first retaining arm 134 and the crossbar 154. Similarly, the second retaining vertex 152 may form a second retaining angle 158 between the second retaining arm 136 and the crossbar 154. In an exemplary aspect, the first retaining angle 156 is coequal with the second retaining angle 158. In some aspects, the hanging angle 120 may be less than both the first retaining angle 156 and the second retaining angle 158. In other aspects, the hanging angle 120 may be equal to or greater than each of the first retaining angle 156 and the second retaining angle 158.

As further depicted in FIG. 2, the first hanging arm 106, the second hanging arm 108, and the crossbar 154 may together form a generally triangular shape when viewed from a front plan view direction, or a direction orthogonal to a rear plane and/or front plane as disclosed herein below. The closed-loop frame body 102 may also be symmetrical about a central vertical axis 166 or longitudinal plane that divides the closed-loop frame body 102 into left and right halves.

Figure 4A:
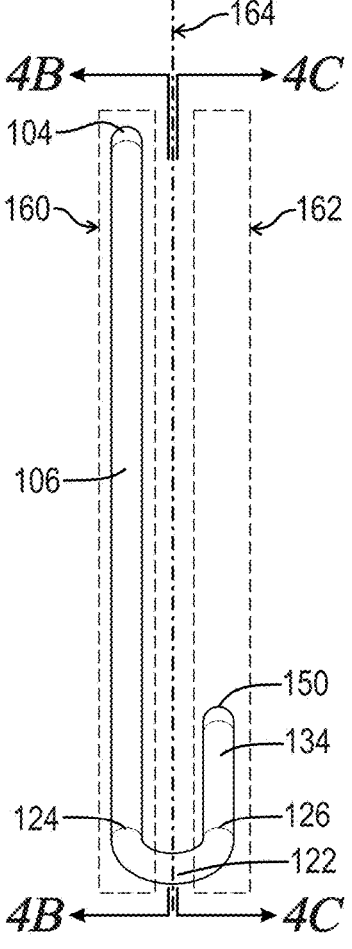
FIGS. 4A-4C depict front and rear planes of reference of the animal hanging device 100 according to an aspect of the present disclosure.
Figures 4B, 4C:
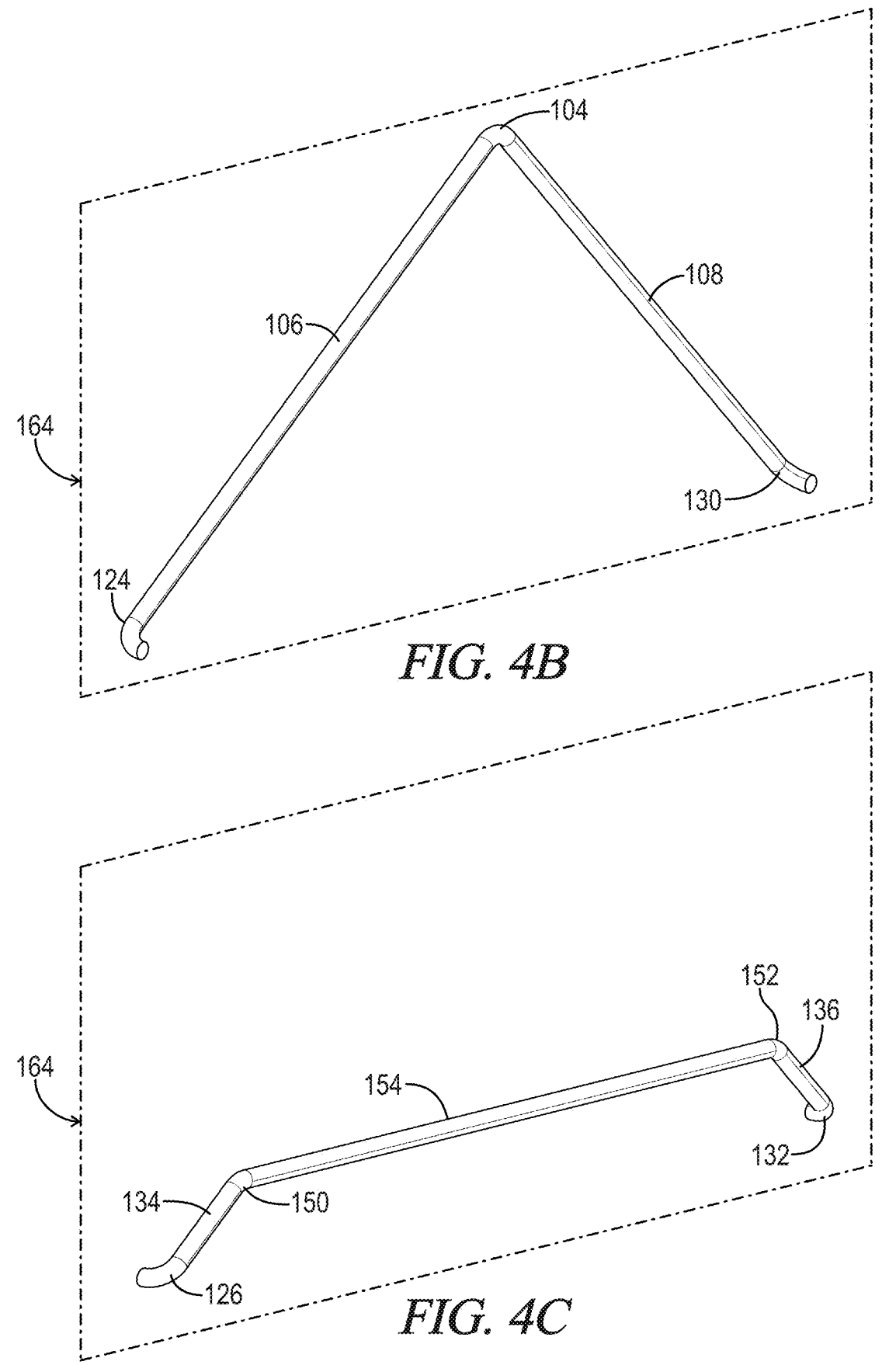

FIGS. 4A-4C depict front and rear planes of reference of the animal hanging device 100 according to an aspect of the present disclosure. In some aspects, some portions of the closed-loop frame body 102 may define a rear plane 160 of the closed-loop frame body 102 and some other portions of the closed-loop frame body 102 may define a front plane 162 of the closed-loop frame body 102. In an exemplary aspect, the rear plane 160 and the front plane 162 may be separated by a frontal plane 164 as known to those in the art. In some aspects, the hanging vertex 104, the first hanging arm 106, the second hanging arm 108, the first end 124 of the first bend 122 and the first end 130 of the second bend 128 are all aligned together in the rear plane 160 of the closed-loop frame body 102. The crossbar 154, the first retaining arm 134, the second retaining arm 136, the second end 126 of the first bend 122, and the second end 132 of the second bend 128 may all be aligned in the front plane 162 of the closed-loop frame body 102. In an exemplary aspect, the portions of the closed-loop frame body 102 aligned in the rear plane 160 and the portions of the closed-loop frame body 102 aligned in the front plane 162 may be joined by the first bend 122 and the second bend 128.

Figure 6:
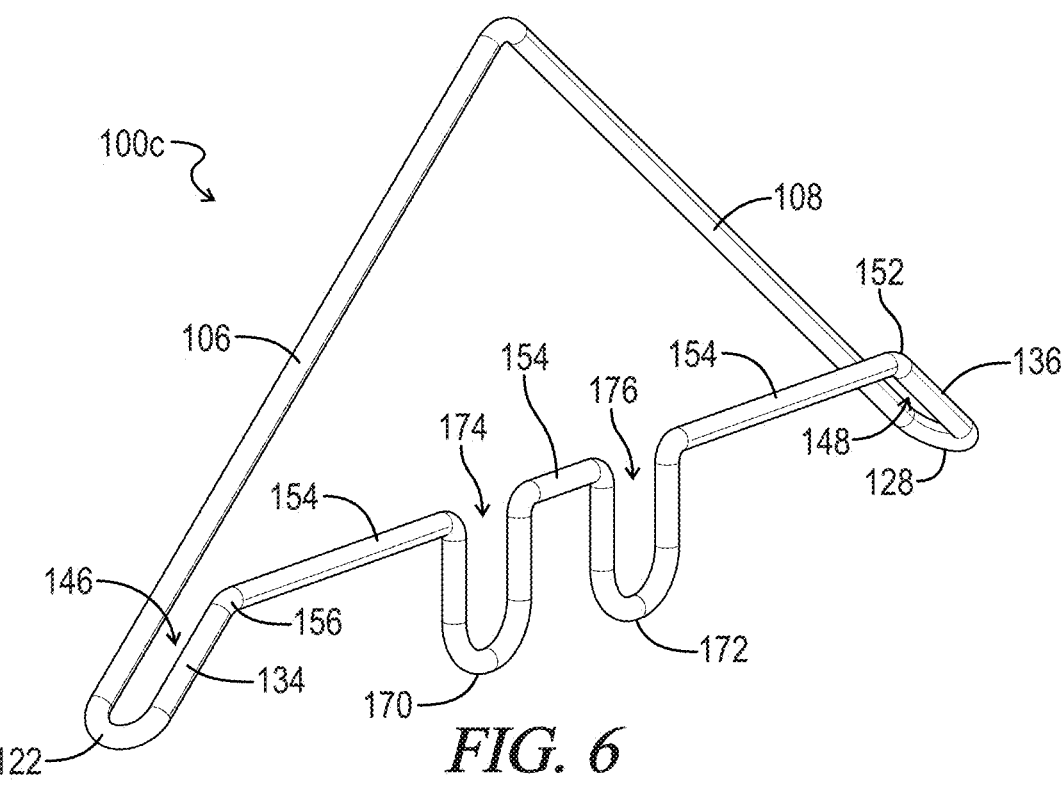
FIG. 6 depicts a perspective view of additional openings of the animal hanging device 100c according to an aspect of the present disclosure.

FIG. 6 depicts a perspective view of additional openings of the animal hanging device 100c according to an aspect of the present disclosure. In some aspects, the animal hanging device 100c may include a one or more openings arranged at an area between the first opening 146 and the second opening 148. In one exemplary aspect, the closed-loop frame body 102 includes a first crossbar curve 170 and a second crossbar curve 172. The first crossbar curve 170 may define a first crossbar opening 174, and the second crossbar curve 172 may define a second crossbar opening 176. Both the first crossbar curve 170 and the second crossbar curve 172 may be provided from the crossbar 154 such that the crossbar 154 includes bends and curves along the crossbar 154. The crossbar 154 of the animal hanging device 100c is thus substantially straight as the crossbar 154 extends between the first retaining vertex 150 and the second retaining vertex 152. In some aspects, the first crossbar curve 170 and the second crossbar curve 172 may be formed as 180-degree bends, including U-bends. In an exemplary aspect, each of the first crossbar curve 170 and the second crossbar curve 172 extend from the crossbar 154 and are aligned in the front plane 162 along with the crossbar 154, the first retaining vertex 150, the second retaining vertex 152, the first retaining arm 134, and the second retaining arm 136. In other aspects, each of the first crossbar curve 170 and the second crossbar curve 172 may be angled relative to the front plane 162 to extend either toward the rear plane 160 or in the opposite direction. Each of first crossbar curve 170 and the second crossbar curve 172 may include the textured surface 168 as disclosed above.

Figure 7:
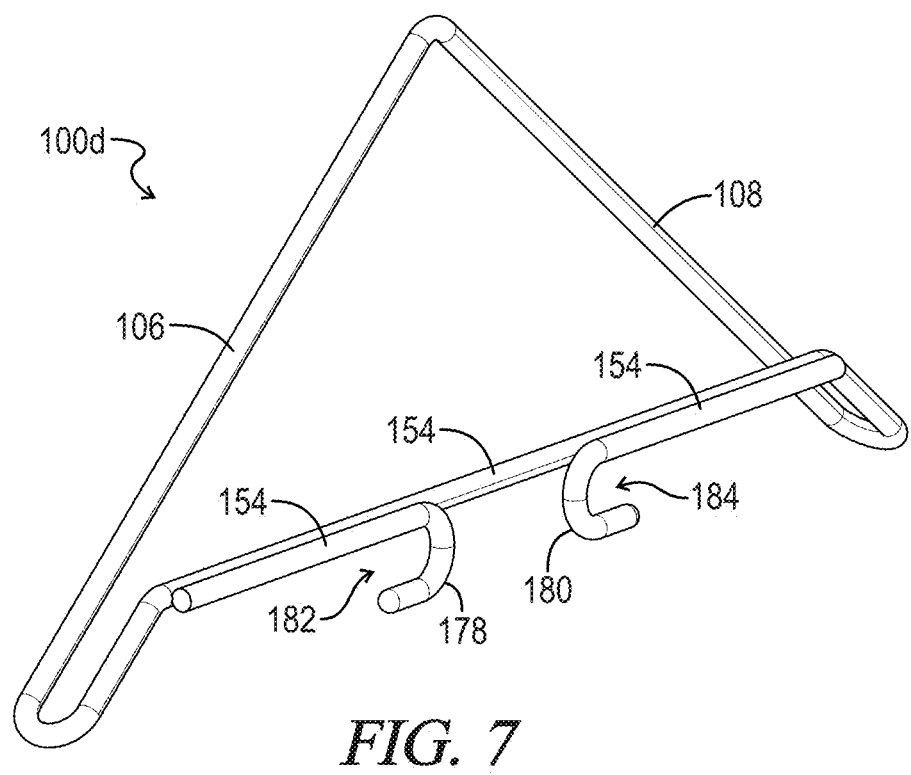
FIG. 7 depicts a front plan view of additional openings of the animal hanging device 100d according to an aspect of the present disclosure.

FIG. 7 depicts a front plan view of additional openings of the animal hanging device 100*d* according to an aspect of the present disclosure. In some aspects, the animal hanging device 100*d* may include a first crossbar bend 178 and a second crossbar bend 180. The first crossbar bend 178 may define a first crossbar bend opening 182, and the second crossbar bend 180 may define a second crossbar bend opening 184. Each of the first crossbar bend 178 and the second crossbar bend 180 may be arranged on the crossbar 154. In an exemplary aspect, the crossbar 154 extends substantially straight between the first retaining vertex 150 and the second retaining vertex 152 and further includes the first crossbar bend 178 and the second crossbar bend 180. The first crossbar bend 178 and the second crossbar bend 180 may extend from the crossbar 154 in a manner such that each of the first crossbar bend 178 and the second crossbar bend 180 are aligned in the front plane 162 with the crossbar 154 the first retaining vertex 150, the second retaining vertex 152, the first retaining arm 134, and the second retaining arm 136. In some aspects, each of the first crossbar bend 178 and the second crossbar bend 180 may extend from the crossbar 154 at an angle relative to the front plane 162 such that the first crossbar bend 178 and the second crossbar bend 180 extend either both towards the rear plane 160 or the opposite direction. In some aspects, the first crossbar bend 178 and the second crossbar bend 180 may extend at different angles from the crossbar 154. In an exemplary aspect, each of the first crossbar bend 178 and the second crossbar bend 180 have a free end and an end connected to the crossbar 154. The first crossbar bend 178 and the second crossbar bend 180 may be formed as 180-degree bends, including U-bends. Each of the first crossbar bend 178 and the second crossbar bend 180 may include the textured surface 168 as disclosed herein.

Figure 8A:
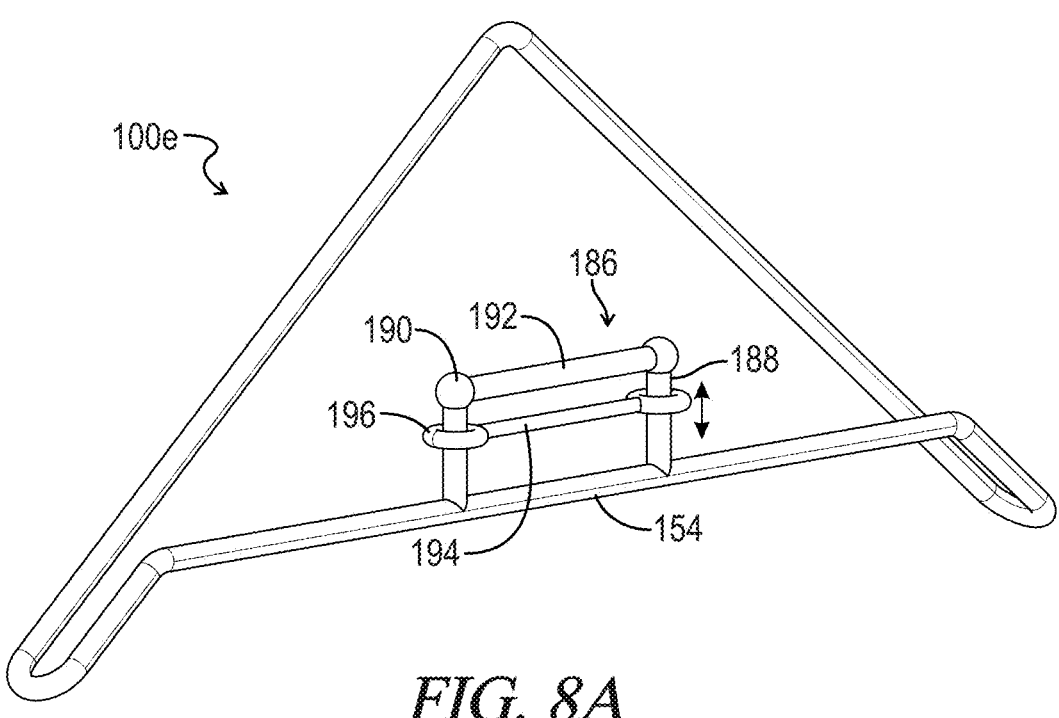
FIGS. 8A-8B depict front plan views of additional openings of the animal hanging device 100e according to an aspect of the present disclosure.
Figure 8B:
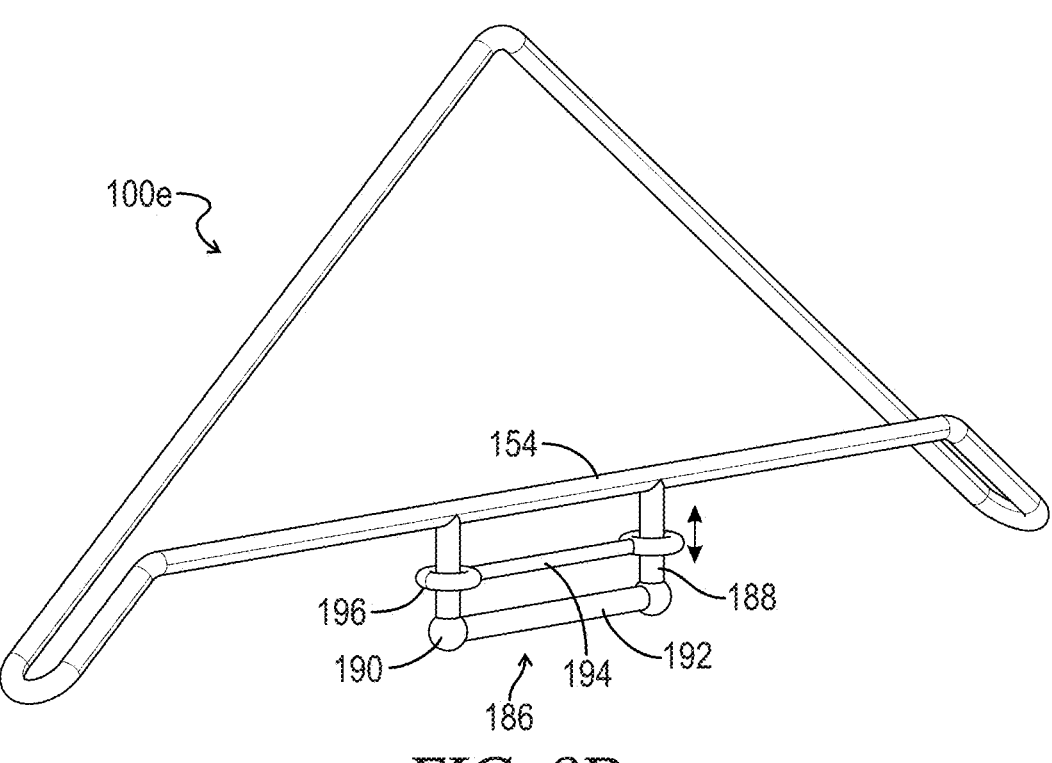

FIGS. 8A-8B depict front plan views of additional openings of the animal hanging device 100*e* according to an aspect of the present disclosure. In some aspects, the animal hanging device 100*e* may include a crossbar clamp assembly 186. The crossbar clamp assembly 186 may be arranged to extend from the crossbar 154. The crossbar clamp assembly 186 may include a pair of crossbar extensions 188 which extend from the crossbar 154. At the end of each of the crossbar extensions 188 is an extension cap 190. Each of the crossbar extensions 188 are connected by an extension bridge 192. The extension bridge 192 may extend between each extension cap 190 of each of the crossbar extensions 188. Each of the crossbar extensions 188, the extension cap 190, and the extension bridge 192 may be rigidly fixed to one another such that there is no movement among the crossbar extensions 188, the extension cap 190, the extension bridge 192 as joined to the crossbar 154. The crossbar clamp assembly 186 may further include a sliding clamp bar 194 slideably arranged along each of the crossbar extensions 188. The sliding clamp bar 194 may be slideably coupled with each of the crossbar extensions 188 via a ring 196 encircling each of the crossbar extensions 188. In operation, the sliding clamp bar 194 may slide along each of the crossbar extensions 188 and in a range between the crossbar 154 and the extension bridge 192. The sliding clamp bar 194 may define an opening on each side of the sliding clamp bar 194 configured to receive a portion of an animal, with one opening being arranged between the sliding clamp bar 194 and the extension bridge 192 and between each of the crossbar extensions 188, and another opening being arranged between the sliding clamp bar 194 and the crossbar 154 and between each of the crossbar extensions 188. Each surface of the extension bridge 192, the sliding clamp bar 194, the crossbar 154, or a combination thereof may include the textured surface 168 as disclosed herein.

As depicted in FIG. 8A, the crossbar clamp assembly 186 may extend upwardly from the crossbar 154 towards the hanging vertex 104. In other aspects, such as depicted in FIG. 8B, the crossbar clamp assembly 186 may extend downwardly from the crossbar 154. In an exemplary aspect, the crossbar clamp assembly 186 may be aligned in the front plane 162 with the crossbar 154, the first retaining arm 134, and the second retaining arm 136. In other aspects, the crossbar clamp assembly 186 may extend from the crossbar 154 at an angle relative to the front plane 162.

Figure 9A:
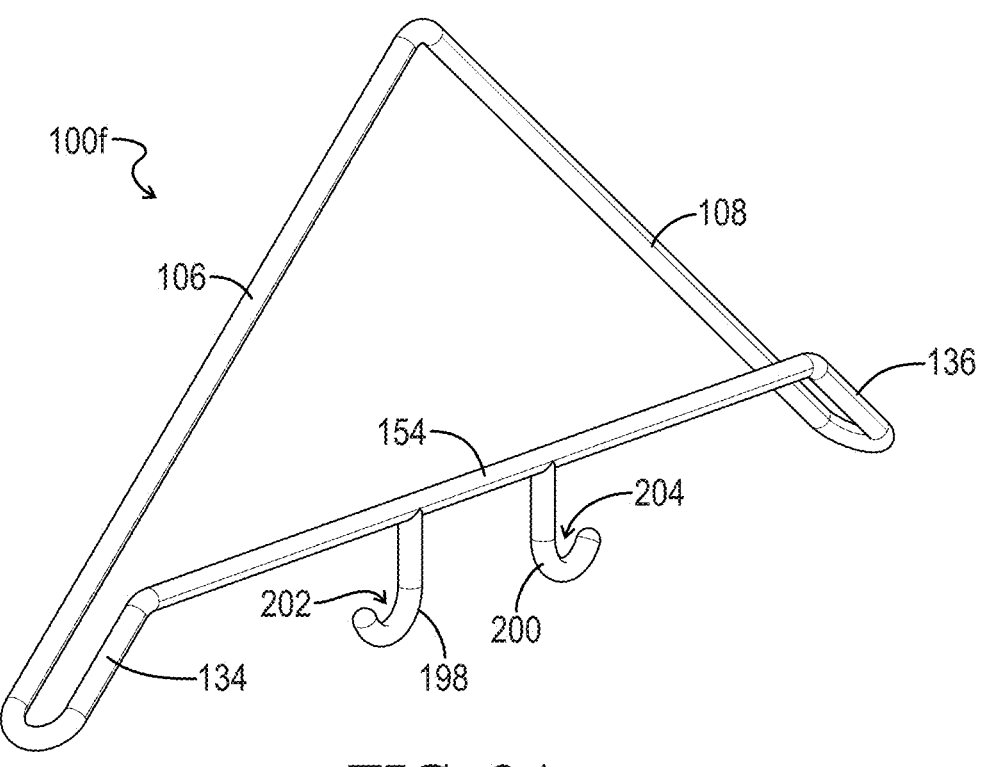
FIGS. 9A-9B depict additional openings of the animal hanging device 100f according to an aspect of the present disclosure.
Figure 9B:
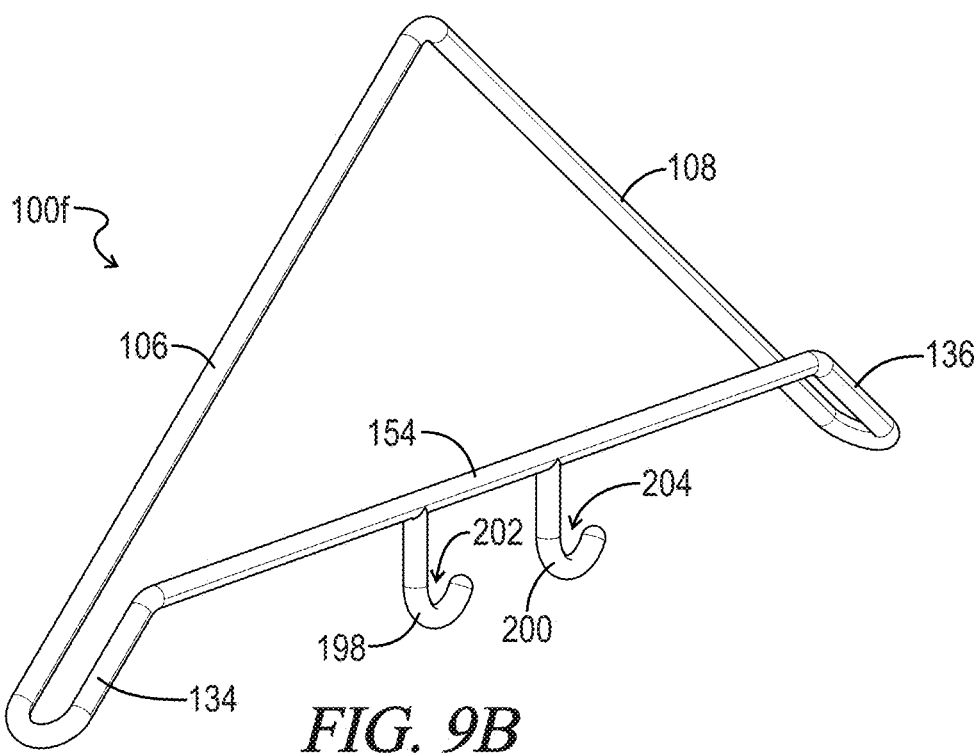

FIGS. 9A-9B depict additional openings of the animal hanging device 100*f* according to an aspect of the present disclosure. In some aspects, the animal hanging device 100*f* may include a first crossbar hook 198 and a second crossbar hook 200, defining a first crossbar hook opening 202 and a second crossbar hook opening 204, respectively. Each of the first crossbar hook 198 and the second crossbar hook 200 may be arranged to extend from the crossbar 154. In some aspects, each of the first crossbar hook 198 and the second crossbar hook 200 may include a curved cantilever style hook, with one end connected to the crossbar 154 of the closed-loop frame body 102 and the other end being free. The free end of each of the first crossbar hook 198 and the second crossbar hook 200 may be arranged at the end of a curved portion of the first crossbar hook 198 and the second crossbar hook 200. In an exemplary aspect, each of the first crossbar hook 198 and the second crossbar hook 200 are provided a J-hooks, with each hook extending substantially straight from the crossbar 154, then curving an amount to terminate in a free end. Each of the first crossbar hook 198 and the second crossbar hook 200 may include the textured surface 168 as disclosed herein.

In an exemplary aspect depicted in FIGS. 9A-9B, each of the first crossbar hook 198 and the second crossbar hook 200 may be entirely aligned in the front plane 162 with the crossbar 154, the first retaining arm 134, and the second retaining arm 136. In some aspects, the free end and curved portion of each of the first crossbar hook 198 and the second crossbar hook 200 extend from the front plane 162 either toward the rear plane 160, away from the rear plane 160, or each of the first crossbar hook 198 and the second crossbar hook 200 may extend in opposing directions relative to the front plane 162.

In some aspects, each of the hanging vertex 104, first retaining vertex 150, and second retaining vertex 152 may be provided with varying degrees of curvature to the vertex and need not be limited to a singular point where two line structures converge. In some aspects, each vertex may have a small degree of curvature.

In some aspects, each of the animal hanging device 100*a*-100*f* include the structure of the animal hanging device 100 as disclosed herein and differ only to the extent specifically disclosed and depicted herein. Each of the aspects disclosed herein regarding the animal hanging device 100*a*-100*f* may be selectively incorporated or combinable with aspects of the animal hanging device 100.

Figure 10:
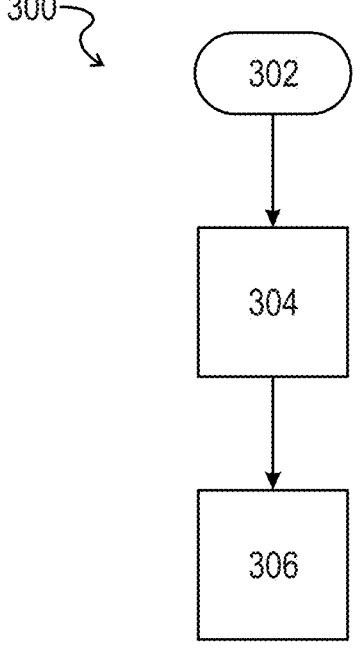
FIG. 10 depicts a method 300 of using the animal hanging device 100.

FIG. 10 depicts a method 300 of using the animal hanging device 100. In some aspects, the method 300 may include a step of providing 302 the animal hanging device 100, including the closed-loop frame body 102, which may include the hanging vertex 104, the first hanging arm 106 and the second hanging arm 108 extending from the hanging vertex 104, the first bend 122 arranged at an end of the first hanging arm 106, the second bend 128 arranged at an end of the second hanging arm 108, a first retaining arm 134 arranged to extend from the first bend 122, a second retaining arm 136 arranged to extend from the second bend 128, and a crossbar 154 extending between the first retaining arm 134 and the second retaining arm 136. The method 300 may also include a step of hanging 304 the animal hanging device 100 from a support structure by the hanging vertex 104. In some aspects, the step of hanging 304 the animal hanging device 100*a* may utilize both the animal hanging device 100*a* and the second hanging vertex 104*b* for hanging the animal hanging device 100*a* from the support structure. The method 300 may also include a step of arranging 306 a portion of an animal in first opening 146, the second opening 148, or both. In some aspects, the step of arranging 306 a portion of an animal on the 100*c*-100*f* may include arranging a portion of the animal in openings formed by the first crossbar curve 170, the second crossbar curve 172, the first crossbar bend 178, the second crossbar bend 180, the crossbar clamp assembly 186, the first crossbar hook 198, the second crossbar hook 200, or a combination thereof disclosed herein.

As used herein, the phrase "one or more of," when used with a list of items, means that different combinations of one or more of the items may be used and only one of each item in the list may be needed. For example, "one or more of" item A, item B, and item C may include, for example, without limitation, item A or item A and item B. This example also may include item A, item B, and item C, or item B and item C.

The terms "substantially" and "generally" are defined as largely, but not necessarily wholly, what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent. As used herein, the terms 'substantially straight' and 'substantially parallel' are intended to describe orientations or configurations that are generally straight or parallel, but may allow for minor deviations from absolute straightness or parallelism. Such deviations may arise due to manufacturing tolerances, material properties, or functional requirements of the invention. Accordingly, these terms encompass configurations that are, for practical purposes, straight or parallel, even if small degrees of curvature, angulation, or variation are present that do not materially affect the overall performance or functionality of the claimed invention.

The terms "about" and "approximately" shall generally mean an acceptable degree of error for the quantity measured given the nature or precision of the measurements. Typically, exemplary degrees of error are within 20 percent (%), preferably within 10%, and more preferably within 5% of a given value or range of values. Numerical quantities given herein are approximate unless stated otherwise, meaning that the term "about" or "approximately" can be inferred when not expressly stated.

Thus, it is seen that the apparatus and methods of the present disclosure readily achieve the ends and advantages mentioned as well as those inherent therein. While certain aspects of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or aspect may be combined with any of the other disclosed features or aspects.

We claim:

1. An animal hanging device, comprising:
a closed-loop frame body, comprising:
    a hanging vertex;
    a first arm extending from the hanging vertex at a first end of the first arm to a second end of the first arm;
    a second arm extending from the hanging vertex at a first end of the second arm to a second end of the second arm;
    a first bend with a first end of the first bend arranged at the second end of the first arm;
    a second bend with a first end of the second bend arranged at the second end of the second arm;
    a crossbar arranged between a second end of the first bend and a second end of the second bend;
    a first retaining arm arranged at a second end of the first bend and extending substantially parallel to the first arm and from the second end of the first bend to a second end of the first retaining arm;
    a second retaining arm arranged at a second end of the second bend and extending substantially parallel to the second arm and from the second end of the second bend to a second end of the second retaining arm; and
    wherein the second end of the first retaining arm is arranged at a first retaining vertex and the second end of the second retaining arm is arranged at a second retaining vertex;
    wherein the crossbar is arranged directly between the first retaining vertex and the second retaining vertex.

2. The animal hanging device of claim 1, wherein:
the closed-loop frame body is formed of a continuous and homogenous metal material.

3. The animal hanging device of claim 1, wherein:
the closed-loop frame body is substantially rigid.

4. The animal hanging device of claim 1, wherein:
the closed-loop frame body is not collapsible.

5. The animal hanging device of claim 1, wherein:
the first arm, the second arm, the first retaining arm, the second retaining arm, and the crossbar extend substantially straight.

6. The animal hanging device of claim 1, wherein:
the hanging vertex forms a hanging angle between the first arm and the second arm;
the first retaining vertex forms a first retaining angle between the first retaining arm and the crossbar;
the second retaining vertex forms a second retaining angle between the second retaining arm and the crossbar; and
the first retaining angle is equal to the second retaining angle.

7. The animal hanging device of claim 6, wherein:
the hanging angle is less than the first retaining angle and the second retaining angle.

8. The animal hanging device of claim 1, wherein:
the closed-loop frame body consists of bent rod with a substantially circular cross-section.

9. The animal hanging device of claim 1, wherein:
the hanging vertex, the first arm, the second arm, a first end of the first bend, and a first end of the second bend are substantially aligned in a rear plane;
the crossbar, the first retaining vertex, the second retaining vertex, the first retaining arm, the second retaining arm, the second end of the first bend, and the second end of the second bend are substantially aligned in a front plane; and the rear plane and the front plane are separated by an extension of the first bend and an extension of the second bend.

10. The animal hanging device of claim 9, wherein:

the first arm, the second arm, and the crossbar form a triangular shape from a direction orthogonal to the rear plane and the front plane.

11. The animal hanging device of claim 9, wherein:

the closed-loop frame body is symmetrical about a vertical axis from a direction orthogonal to the rear plane and the front plane.

12. The animal hanging device of claim 1, wherein:

the first bend and the second bend each comprise one or more protrusions configured to engage one or more portions of the animal.

13. The animal hanging device of claim 1, wherein:

the first retaining arm, the second retaining arm, a portion of the first arm extending from the second end of the first arm to a distance equal to a length of the first retaining arm, a portion of the second arm extending from the second end of the second arm to a distance equal to a length of the second retaining arm, or a combination thereof further comprise a textured surface.

14. The animal hanging device of claim 13, wherein:

the textured surface comprises one or more protrusions, knurling, or grooves.

15. An animal hanging device, comprising:

a closed-loop frame body, comprising:

a hanging vertex;

a pair of hanging arms extending from the hanging vertex and defining a hanging angle therebetween;

a pair of 180-degree bends, each one of the pair of 180-degree bends arranged at an end of each arm of the pair of arms opposite the hanging vertex;

a pair of retaining arms, each retaining arm arranged at an end of each one of the pair of 180-degree bends opposite a corresponding one of the pair of hanging arms, each retaining arm of the pair of retaining arms extending substantially parallel to the corresponding one of the pair of hanging arms;

each one of the pair of retaining arms comprising an end arranged at a hanging vertex opposite another end of each of the pair of retaining arms at a corresponding one of the pair of 180-degree bends;

a crossbar connecting the pair of retaining arms and arranged directly between the hanging vertex of each of the pair of retaining arms.

16. The animal hanging device of claim 15, wherein:

the pair of 180-degree bends comprise a pair of U-bends.

17. The animal hanging device of claim 15, wherein:

each retaining arm of the pair of retaining arms extends parallel with and a length less than each corresponding hanging arm.

18. The animal hanging device of claim 15, wherein:

each hanging arm, 180-degree bend, and retaining arm together forms an opening configured to receive a portion of the animal.

19. The animal hanging device of claim 15, wherein:

the closed-loop frame body comprises a rigid and non-collapsible frame formed of a metal material.

\* \* \* \* \*